Patented Jan. 27, 1925.

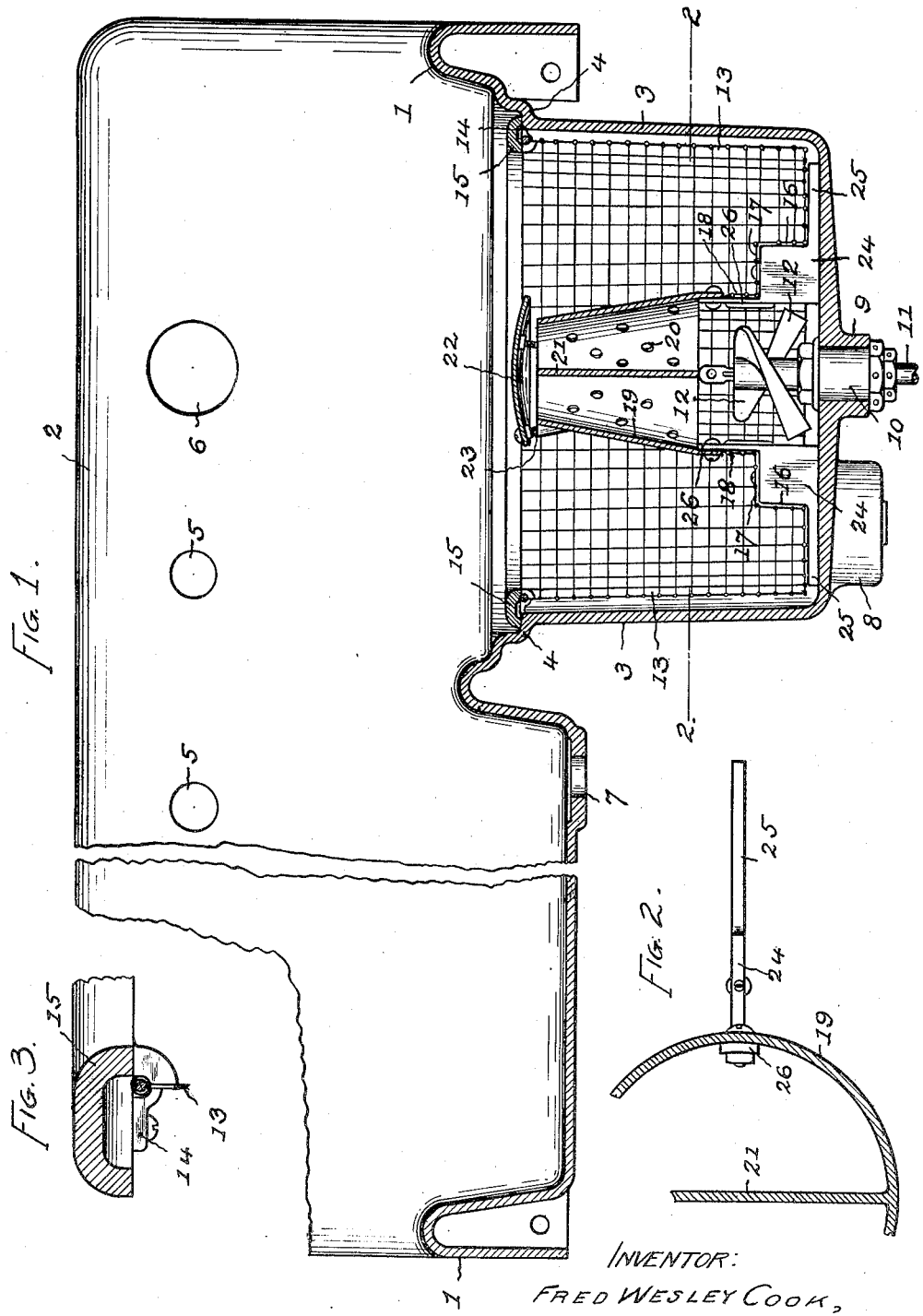

1,524,084

UNITED STATES PATENT OFFICE.

FRED WESLEY COOK, OF NORTH CHICAGO, ILLINOIS, ASSIGNOR TO CHICAGO HARDWARE FOUNDRY COMPANY, OF NORTH CHICAGO, ILLINOIS, A CORPORATION OF ILLINOIS.

CONTAINING BASKET FOR DISHWASHING MACHINES.

Application filed December 6, 1921. Serial No. 520,257.

*To all whom it may concern:*

Be it known that I, FRED WESLEY COOK, a citizen of the United States of America, residing at North Chicago, in the county of Lake and State of Illinois, have invented certain new and useful Improvements in Containing Baskets for Dishwashing Machines, of which the following is a specification.

This invention relates to containing baskets for that class of washing machines for dishes and like articles in which a rotary propeller arranged centrally in the bottom portion of the washer bowl or casing is adapted to effect a rapid circulation of the cleaning fluid against the dishes, etc., supported in the basket or holder and which is loosely supported on and removably arranged in the bowl or casing leaving the rotary propeller remaining in the bowl or casing. The present improvement has for its objects:—

To provide a structural formation and association of parts in such type of washing machines whereby the cleaning fluid is effectively directed in different directions upon and against the contained articles to attain a rapid and effective cleaning of the same.

To provide means whereby a rotary movement of the cleaning fluid within the bowl or casing is retarded and the operation of the rotary propeller rendered more effective in attaining movement of the cleaning fluid in the desired outward radial directions adapted to effect a rapid and efficient cleaning action.

To provide a simple and convenient formation of the containing basket or holder and associated parts whereby the dishes are supported in proper position for effective cleaning without undue impedance of the outward radial movements of fluid by the rotary propeller, all as will hereinafter more fully appear.

In the accompanying drawing:—

Fig. 1, is a longitudinal vertical section illustrating the invention applied to a combined or unitary dish washing machine and kitchen sink.

Fig. 2, is an enlarged fragmentary horizontal section on line 2—2 Fig. 1 showing parts of the tubular shell and partition and a radially disposed stepped plate or baffle.

Fig. 3, is an enlarged detail section showing the connection of dish basket to its marginal supporting ring whereby it is removably supported in the bowl or casing independent of the rotary propeller.

Like reference numerals indicate like parts in the different views.

Referring to the drawing, 1 designates a kitchen sink having the usual vertical rear splash plate 2 with one end formed into a depending bowl 3 open at its upper end and closed at bottom to constitute the casing of the dish washing means.

4 designates a depressed annular ledge at the meeting point of the top of the bowl 3 and the bottom web of the sink 1, forming a rest or seat for the annular supporting ring 15 of the dish holder or basket hereinafter described.

5 and 6 designate orifices in the vertical splash plate 2, for attachment of the usual water supply faucets of sink, and the controlling switch of the electric motor employed to operate the present mechanism.

7 designates the usual drain opening of the sink, and 8 designates the depending crumb trap forming a part of the bottom web of the bowl 3, and provided with the usual outlet neck and other usual accessories.

9 designates a bearing hub formed centrally on the above mentioned bottom web of the bowl 3, provided with a stuffing gland 10 of any usual and suitable construction and adapted to receive in a fluid tight manner a shaft now to be described.

11 designates a vertically arranged shaft passing through the stuffing gland 10, with its lower end connected in any suitable manner to an electric or other motor so as to receive rapid rotation therefrom. At its upper end the shaft 11 carries a propeller 12 of any usual spiral bladed type, adapted in a rapid rotation to impart an upward and outward motion to the cleaning fluid, and with a view to efficient action said propeller is arranged in adjacent relation to the bottom web of the bowl 3, as shown.

13 designates the containing basket or holder of an improved construction for the reception of the dishes, etc., of a circular form corresponding with the circular shape of the interior of the bowl 3, and of a size smaller than the interior of said bowl in order to be capable of ready removal from the propeller and the bowl and replacement in repeated use of the apparatus. The basket or holder 13 is formed of perforate material and preferably of woven wire as shown, and has an open top secured by clips 14 or like fastening means to the annular ring 15 by which it is supported in a depending manner in the bowl or casing 3 as shown. In the present improvement the bottom web of the basket or holder 13 is stepped and extends downwardly from the body of the basket, or holder 13, and is formed with an inner circular upstanding perforate web 16 in spaced relation to the outer circular web of the basket or holder, and said inner web 16 is connected at its upper edge with a horizontal annular raised intermediate perforate web 17, which in turn is connected at its inner edge with a circular upstanding central perforate web 18. The webs 16 and 17 form an enclosing chamber for the propeller 12, while the web 18 forms an outlet from said enclosing chamber for the lateral discharge of a portion of the cleaning fluid as the same is impelled upwardly and outwardly by the action of the propeller 12. In addition the above described construction is adapted to provide an efficient rest or abutment for the lower edges of plates and like flat articles, to maintain the same in proper position while being operated on.

19 designates a tubular shell of a frustro-conical form, open at top and bottom, and arranged centrally in the apparatus. At its lower end the shell 19 is connected to the upper end of the circular perforate central web 18 above described and preferably by the attaching means hereinafter described, and in the preferred construction shown the wall of the shell 19 is formed with a series of orifices 20 adapted to permit outward flow of jets of the cleaning fluid as the same moves upwardly through the interior of the shell.

21 designates a partition centrally arranged and located vertically in the interior of the shell 19, and adapted to prevent a tendency in cleaning fluid to acquire a rotary motion in its upward passage through the shell.

22 designates a cap piece or deflector connected in spaced and adjustable relation to the upper end of the shell 19 by a series of connecting bolts 23. Said cap piece is preferably of a concavo-convex form and of a diameter exceeding the diameter of the upper end of the shell 19 and as so formed is adapted to deflect the upward flow of the cleaning fluid through said shell in an outward and downward direction upon the dishes contained in the basket or holder 13 aforesaid.

24 designates a plurality of radially disposed stepped plates or baffles arranged at the bottom of the bowl or casing 3 and seated on the bowl or casing while the ring 15 supports the basket, at the top, on the angular ledge 4; the basket being connected by the fastening means 14 to the ring 15 as heretofore stated the stepped plates 24, being adapted to support the heretofore described stepped webs 16 and 17 of the basket or holder 13 in proper position, and at the same time retard a tendency to rotation of the cleaning fluid in the lower portion of the bowl or casing 1 in actual use. In the preferred construction shown, the plates or baffles 24 are provided with horizontal extensions or bars 25 adapted to rest under the bottom web of the basket or holder 13 to maintain spaced relation between said bottom web and the inner bottom surface of the bowl or casing 3. Said plates or baffles 24 are also provided with vertical extensions or bars 26 adapted to support the aforesaid circular vertical centrally arranged web 18 of the basket or holder and afford a supporting means for the shell 19, to the lower end of which said bars or extensions are attached by rivets or like fastening means.

With the heretofore described formation and arrangement of parts a forcible and rapid movement of the cleaning fluid in different directions is attained, and an effective washing of the dishes etc, effected in a rapid manner.

Having thus fully described my invention what I claim as new and desire to secure by Letters Patent is:—

A containing basket for dish washing machines comprising a body of perforate material having a stepped bottom formed with an inner upstanding web in spaced relation to the outer web of the basket, a horizontal raised intermediate web with which the inner web is connected at its upper edge, an upstanding central web connected with the intermediate web, a tubular shell having orifices and provided with a central partition above the central web, a cap piece surmounting the shell, means for suspending the containing basket removably in the bowl and radially disposed stepped plates conforming to the stepped bottom secured thereto and adapted to seat on the bottom of the bowl.

Signed at North Chicago, Illinois, this 3rd day of December A. D. 1921.

FRED WESLEY COOK.